June 25, 1929. W. H. ORR 1,718,303
ELECTRIC WATER HEATER
Original Filed Aug. 12, 1927 2 Sheets-Sheet 1

June 25, 1929.  W. H. ORR  1,718,303
ELECTRIC WATER HEATER
Original Filed Aug. 12, 1927    2 Sheets-Sheet 2

Inventor
William H. Orr,

By Clarence A. O'Brien
Attorney

Patented June 25, 1929.

1,718,303

UNITED STATES PATENT OFFICE.

WILLIAM H. ORR, OF CAMDEN, NEW JERSEY.

ELECTRIC WATER HEATER.

Application filed August 12, 1927, Serial No. 212,559. Renewed April 17, 1929.

The present invention relates to an electric water heater and has for its prime object to provide an exceedingly simple and compact structure having means whereby said structure may be immersed in a vessel of water which immersion will cause the closing of an electric circuit and thereby effect the heating of the water because of the resistance offered by said water.

Another very important object of the invention resides in the provision of a structure of this nature having parts capable of easy assembly and disassembly, and affording a structure which is convenient, thoroughly efficient and reliable in use, and well adapted to the purpose for which it is designed.

A still further very important object of the invention resides in the provision of a device of this nature which may be manufactured at a comparatively low cost, but may yet be made strong and durable, and not likely to become out of order.

With the above and numerous other objects in view as will appear as the description proceeds, the invention resides in certain novel features of construction, and in the combination and arrangement of parts as will be hereinafter more fully described and claimed.

In the drawing:—

Figure 4 is a perspective view of the outer electrode.

Figure 5 is a perspective view of the inner electrode, and,

Figure 2:
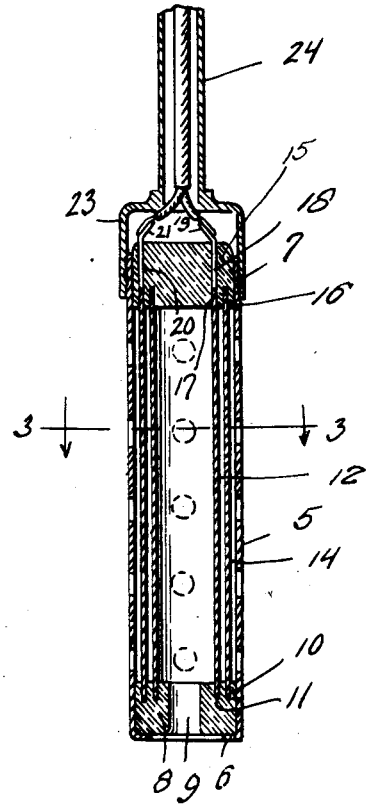
Figure 2 is a longitudinal sectional view through the device.
Figure 3:
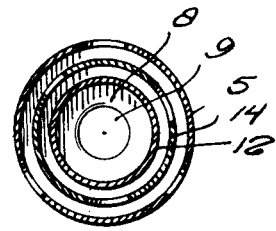
Figure 3 is a transverse section taken substantially on the line 3—3 of Figure 2.
Figure 6:
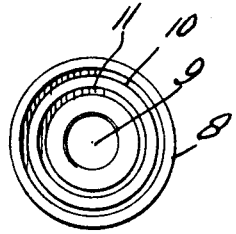
Figure 6 is a plan view of one of the insulators.

Referring to the drawings in detail, it will be seen that the numeral 5 denotes a cylindrical casing having its lower end inturned to form a flange 6. The upper end of the cylindrical casing is threaded as at 7. An insulator block 8 is disposed in the bottom of the casing 5 resting on the flanges 6 and has a central opening 9. This insulator block 8 is formed with annular grooves on the upper surface thereof as at 10 and 11, the latter within the former. A cylindrical or tubular perforated electrode 12 is then disposed in the casing having its lower edge resting in the groove 11. A perforated cylindrical or tubular electrode 14 is disposed in the casing in spaced relation to both the electrode 12 and the casing 5 and has its lower edge resting in the groove 10. An insulator block 15 is formed to fit snugly in the upper end of the casing 5 and on its lower face is formed with grooves 16 and 17 the former of which receives the upper edge of the electrode 14 and the latter of which receives the upper edge of the electrode 12. An opening 18 leads upwardly from the groove 17 to receive a tab 19 formed integrally on the upper edge of the imperforated tubular electrode 12. Another opening 20 is formed in the insulator block 15 leading upwardly from the groove 16 and receives therein a tab or lug 21 formed integrally on the upper edge of the perforated tubular electrode 14. A cap 23 is threaded on the upper end of the casing 5 as at 7 and has a tubular conduit 24 leading therefrom and bent laterally as at 25 so that a laterally disposed handle 26 may be fitted thereon. An electric cord 27 passes through the conduit 25 and the leads thereof are soldered or otherwise secured to the upper ends of the tabs or lugs 19 and 21 as is indicated to advantage in Figure 2.

Figure 1:
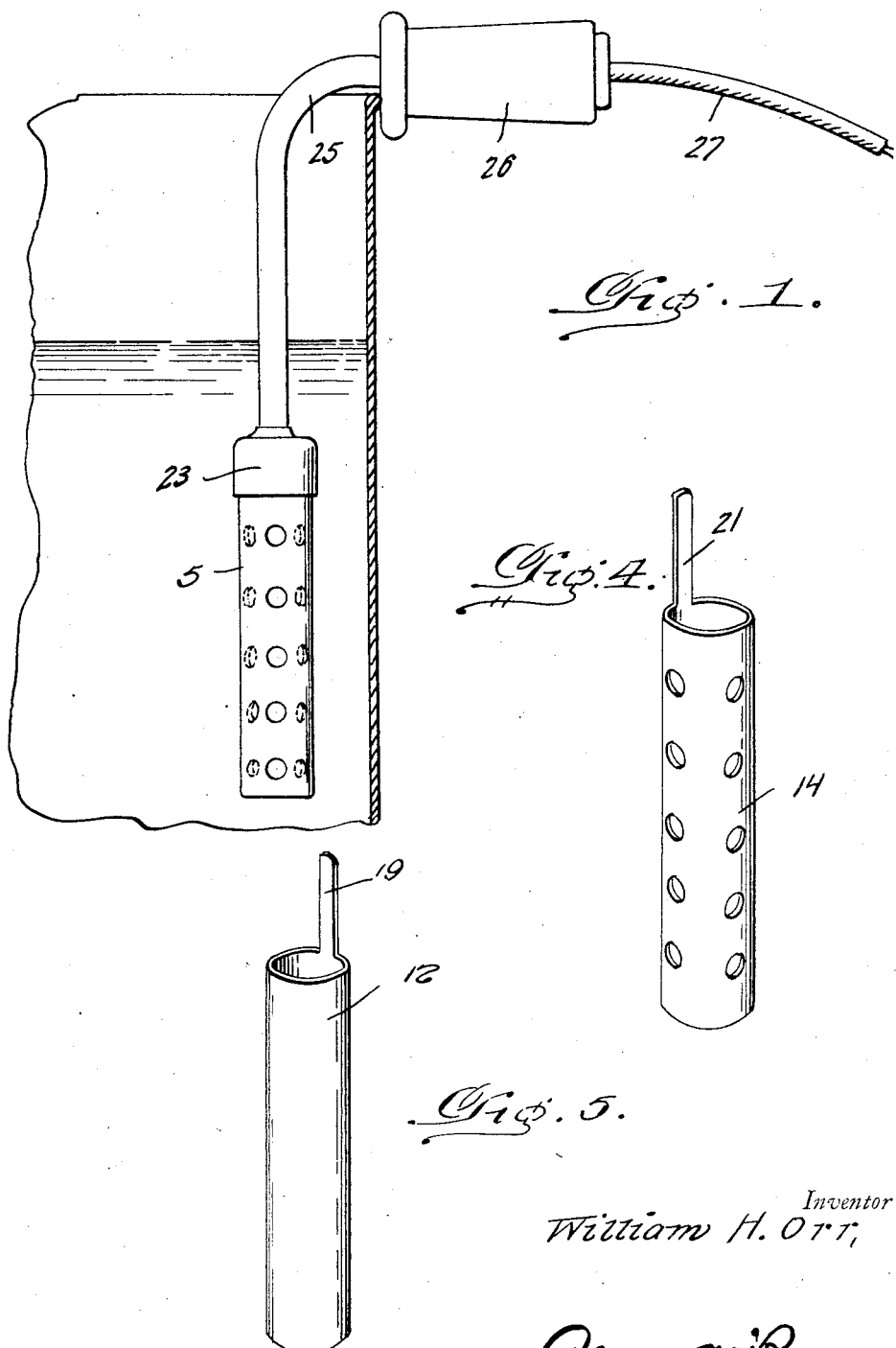
Figure 1 is an elevation of the device embodying the features of my invention showing the same immersed in a body of water.

From the above detailed description it will be seen that the parts of this device may be manufactured cheaply and easily and quickly assembled and disassembled in relation to one another. The device is efficient, economical, and convenient. When the device is used, it is immersed into the water or like fluid to be heated, and this water or fluid will pass up through the opening 9 of the insulator block or plug 8 so as to contact with the inner surface of the imperforated electrode 12. Upon further immersion, the water will pass through the lower openings of the perforated casing 5 and contact with the perforated electrode 14 and pass therethrough to contact with the outer surface of the electrode 12 thereby closing the circuit and offering a resistance to the circuit, causing the water to be heated and turned into steam. In this way, an efficient circulation may be set up so as to quickly heat a pail or other container of water or fluid to be heated. If desired, the device may be mounted on the pail or container as is clearly illustrated in Figure 1 because of the bent conduit 25.

It is thought that the construction, operation, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent, however, that changes in the details of construction, and in the combination and arrangement of parts may be resorted to without departing from the spirit or scope of the invention as hereinafter claimed or sacrificing any of its advantages.

Having thus described my invention, what I claim as new is:—

1. An electric heating device of the class described comprising a perforated casing having one end thereof inturned to provide a flange, an insulator block disposed in the casing and resting on the flange and having a central opening and having its inner face provided with a pair of concentric spaced annular grooves, a pair of cylinderical tubular electrodes one within the other in spaced relation having their lower edges seated in the grooves of the insulator block, an insulator block in the other end of the casing having grooves for receiving the upper edges of the electrodes, lugs extending from said other edges of the electrodes through openings in the second insulator block, a cap threaded on said other end of the casing.

2. An electric heating device of the class described comprising a perforated casing having one end thereof inturned to provide a flange, an insulator block disposed in the casing and resting on the flange and having a central opening and having its inner face provided with a pair of concentric spaced annular grooves, a pair of cylindrical tubular electrodes one within the other in spaced relation having their lower edges seated in the grooves of the insulating block, an insulator block in the other end of the casing having grooves for receiving the upper edges of the electrodes, lugs extending from said other edges of the electrodes through openings in the second insulator block, a cap threaded on said other end of the casing, the inner electrode being imperforated and the outer electrode being perforated.

3. An electric heating device of the class described comprising a perforated casing having one end thereof inturned to provide a flange, an insulator block disposed in the casing and resting on the flange and having a central opening and having its inner face provided with a pair of concentric spaced annular grooves, a pair of cylindrical tubular electrodes one within the other in spaced relation having their lower edges seated in the grooves of the insulator block, an insulator block in the other end of the casing having grooves for receiving the upper edges of the electrodes, lugs extending from said other edges of the electrodes through openings in the second insulator block, a cap threaded on said other end of the casing, a conduit fixed to the cap and extending therefrom and curved intermediate its ends.

4. An electric heating device of the class described comprising a perforated casing having one end thereof inturned to provide a flange, an insulator block disposed in the casing and resting on the flange and having a central opening and having its inner face provided with a pair of concentric spaced annular grooves, a pair of cylindrical tubular electrodes one within the other in spaced relation having their lower edges seated in the grooves of the insulator block, an insulator block in the other end of the casing having grooves for receiving the upper edges of the electrodes, lugs extending from said other edges of the electrodes through openings in the second insulator block, a cap threaded on said other end of the casing, a conduit fixed to the cap and extending therefrom and curved intermediate its ends, a handle on the outer end of the conduit, an electric cord passing through the conduit and having leads electrically connected with the lugs, in the cap.

5. An electric heating device of the class described comprising a perforated casing having one end thereof inturned to provide a flange, an insulator block disposed in the casing and resting on the flange and having a central opening and having its inner face provided with a pair of concentric spaced annular grooves, a pair of cylindrical tubular electrodes one within the other in spaced relation having their lower edges seated in the grooves of the insulating block, an insulator block in the other end of the casing having grooves for receiving the upper edges of the electrodes, lugs extending from said other edges of the electrodes through openings in the second insulator block, a cap threaded on said other end of the casing, the inner electrode being imperforated and the outer electrode being perforated, a conductor fixed to the cap and extending therefrom and curved laterally at its outer end, an electric cord passing through the conductor and having leads electrically connected with the lugs.

In testimony whereof I affix my signature.

WILLIAM H. ORR.